United States Patent [19]

Sato et al.

[11] 4,192,598
[45] Mar. 11, 1980

[54] MIRROR DRIVING DEVICE FOR USE IN A SINGLE LENS REFLEX CAMERA

[75] Inventors: Akihiko Sato; Yoshitaka Araki, both of Tokyo, Japan

[73] Assignee: Nippon Kogaku K.K., Tokyo, Japan

[21] Appl. No.: 895,614

[22] Filed: Apr. 12, 1978

[30] Foreign Application Priority Data

Apr. 19, 1977 [JP] Japan .................................. 52-44142

[51] Int. Cl.² ............................................. G03B 19/12
[52] U.S. Cl. .................................................. 354/153
[58] Field of Search ....................... 354/152, 153, 156

[56] References Cited

U.S. PATENT DOCUMENTS 3,891,992  6/1975  Ueda et al. .......................... 354/152

FOREIGN PATENT DOCUMENTS 1077126  7/1967  United Kingdom ..................... 354/156

*Primary Examiner*—John Gonzales

*Attorney, Agent, or Firm*—Fitzpatrick, Cella, Harper & Scinto

[57] ABSTRACT

A mirror driving device for use in a single lens reflex camera comprises a driving lever pivotally mounted to the body of the camera, a mirror pin movable integrally with the mirror, and biasing means provided on the driving lever. The mirror pin is surrounded by a bent portion provided at one end of the driving lever and two springs of the biasing means. One of the two springs has relatively strong biasing force and engages the bent portion, while the other spring has relatively weak biasing force and always biases the mirror pin in such a direction that the mirror may descend. Upon forwarding motion of the driving lever the mirror pin is moved by the end of said lever, thereby raising the mirror. Upon returning motion of said lever the mirror pin is moved by the two springs, thereby lowering the mirror. When the lever is in its original position the mirror is pressed in a viewing-focusing position solely with the biasing force of the other spring.

5 Claims, 8 Drawing Figures

MIRROR DRIVING DEVICE FOR USE IN A SINGLE LENS REFLEX CAMERA

BACKGROUND OF THE INVENTION

1. Field of the Invention

The present invention relates to a mirror driving device for use in a single lens reflex camera, and is particularly directed to such a mirror driving device as will not damage the other components even if a mirror is carelessly moved when the mirror is in a viewing-focusing position.

2. Description of the Prior Art

According to the prior art, in a single lens reflex camera, a similar device is already provided in which a pin movable integrally with the mirror is pinched between a lever and a spring and wherein the mirror may be retracted from the viewing position to a position outside an optical path during phototaking by moving said lever and be then returned to the viewing position in the optical path by the biasing force of said spring as the lever returns to its original position. In this viewing position the mirror is positioned by said biasing force of the spring.

In such a prior art device, however, the stronger the force of the spring becomes, the bigger the friction between the spring and the pin gets when the mirror ascends to make it difficult for the mirror to be instantaneously raised, while a spring having weak biasing force will result in delayed descending operation of the mirror at returning movement of the lever. Consequently such a known device is disadvantageous in that high-speed motion of the mirror is prevented whether the spring force is selected strong or weak.

SUMMARY OF THE INVENTION

The object of the present invention, therefore, is to provide a mirror driving device in which frictional resistance during ascending movement of the mirror is reduced and the mirror descends integrally with the lever upon returning movement thereof and which renders high-speed motion of the mirror possible.

BRIEF DESCRIPTION OF THE DRAWINGS

Other objects and many of the attendant advantages of the invention will become appreciated by reference to the following description when considered in conjunction with the accompanying drawings illustrating embodiments of the subject invention, wherein.

DESCRIPTION OF THE PREFERRED EMBODIMENTS

Figure 1:
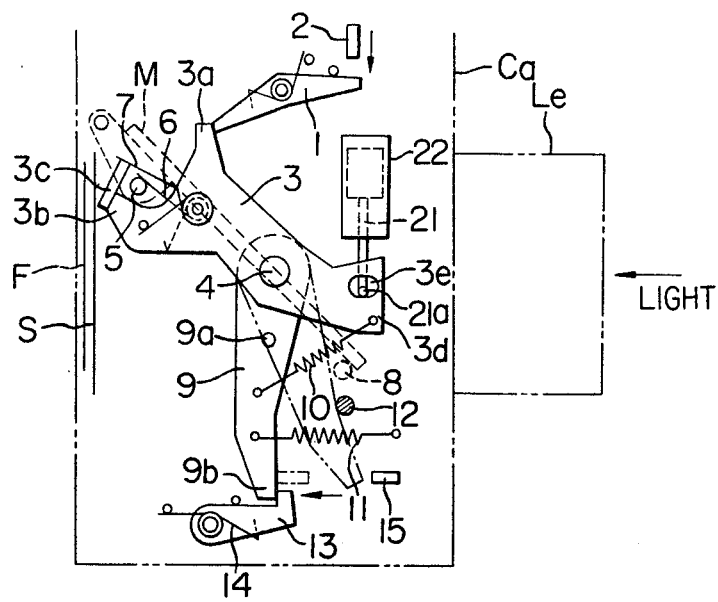
FIGS. 1 and 2 are schematic elevations of the mirror driving device according to an embodiment of the invention, in a state where a mirror is completely charged and in a state where the mirror is raised, respectively.

Referring first to the construction of FIG. 1, Ca is a body of a camera, Le is a lens, S is a first blind, and F is a photographic film. A mirror ascending key 1 is biased counterclockwise and will be actuated by a release lever 2 at phototaking, i.e. when a shutter button (not shown) is depressed. A driving lever 3 is rotatably supported on a fixed shaft 4 and is provided with an end portion 3a engaging with the mirror ascending key 1, an end portion 3b engaging with a mirror pin 5 formed integrally with a mirror M and a bent portion 3c provided at the end of the end portion 3b. On the driving lever 3 there are provided a spring 6 having strong spring force (hereinafter referred to as a strong spring) and a spring 7 having weak spring force (hereinafter referred to as a weak spring), the former 6 functioning to bias the pin 5 downwards to press the mirror M against a positioning pin 8 while the latter 7 is provided to engage the bent portion 3c. A control lever 9 is rotatably supported on the fixed shaft 4 and is provided with a pin 9a for actuating the driving lever 3. A spring 10 is provided between the control lever 9 and an end portion 3d of the driving lever 3 to bias these elements toward each other. There is also provided a spring 11 to bias the control lever 9 counterclockwise. A pin 12 is provided to limit the rotational motion of the control lever 9. A mirror descending key 13 blocks an end portion 9b of the control lever 9, and is rotated clockwise against the biasing force of a spring 14 upon completion of running of a second blind (not shown). A charging lever 15 is shifted to the left in association with the film advancing operation to rotate the control lever 9 clockwise.

Figure 2:
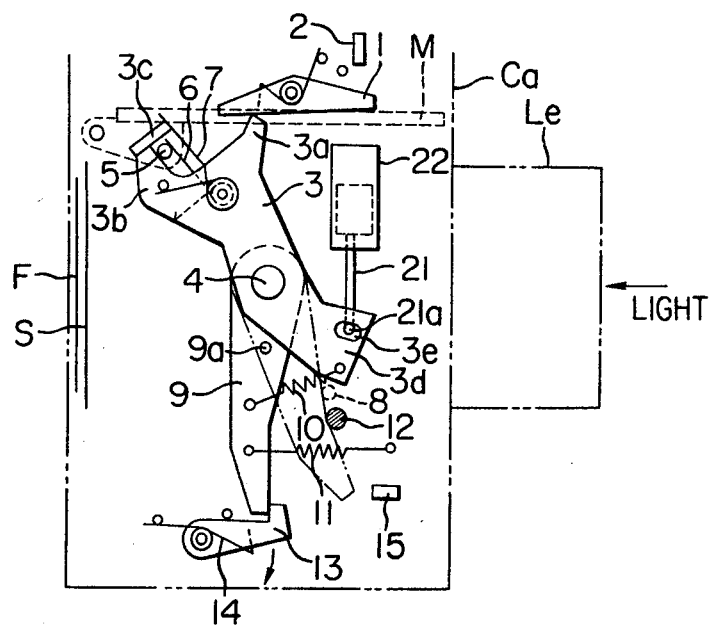
Figure 3:
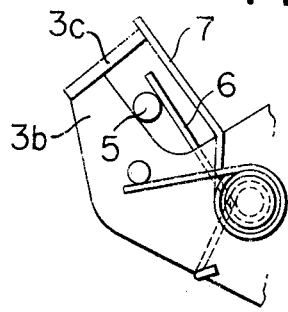
FIGS. 3 and 4 are partial enlarged views during ascension and descension of the mirror, respectively.
Figure 4:
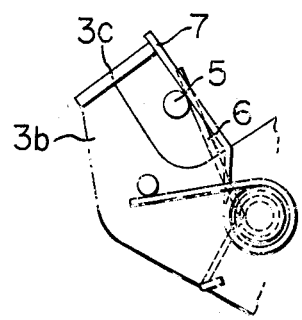
Figure 5:
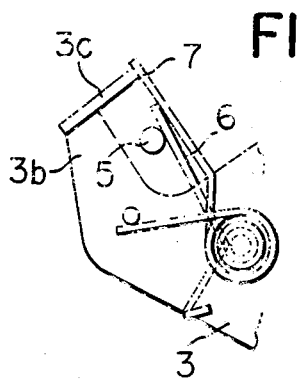
FIGS. 5 and 6 are schematic enlarged views explaining functions when the mirror is in a viewing-focusing position within a photographing optical path and when the mirror is erroneously elevated, both in a state where the mirror is completely charged, respectively.

Now there will be given an explanation on the function of the device of the present invention. In the state of FIG. 1, the mirror M is located with a phototaking optical path, whereby the light from an object passing through the lens Le is reflected by the mirror M toward a view finder optical system (not shown). Upon depression of the shutter button (not shown) in this state, the release lever 2 is lowered to cause, against the biasing force, the clockwise rotational motion of the mirror ascending key 1, whereby the driving lever 3 is released and is rotated clockwise by the biasing force of the spring 10. In this state, as shown in FIG. 3, the mirror pin 5 formed integrally with the mirror M is pinched between the end portion 3b of the driving lever 3 and the weak spring 6, the biasing force of the strong spring 7 being received by the bent portion 3c and not affecting any of the above-mentioned elements. In such manner the mirror pin 5 is pushed up by the end portion 3b of the driving lever 3 through the biasing force of the spring 10, while ascension of the mirror M is hindered only by small friction generated between the weak spring and the mirror pin 5. FIG. 2 shows a state where the mirror M is elevated and retracted from the phototaking optical path. Upon ascention of the mirror M, the first blind is caused to start running by a known means whereupon the photographic film is exposd to light, and the second blind (not shown) successively completes running. Upon completion of the running of the second blind, the mirror descending key 13 rotates clockwise to release the end portion 9b of the control lever 9. Then, the control lever 9 is rotated counterclockwise by the biasing force of the spring 11, whereby the pin 9a forcibly rotates the driving lever 3 counterclockwise from the position shown in FIG. 2. Simultaneously, the end portion 3b leaves the mirror pin 5 by the rotational motion of the driving lever 3, and alternatively the spring 7 having engaged with the bent portion 3c comes into contact with the mirror pin 5 as shown in FIG. 4 to push the pin downward. That is, the biasing force of the spring 11 is transmitted through the control lever 9, the driving lever 3 and the spring 7 to the mirror pin 5 thereby rotating the mirror M clockwise. At this moment the biasing force of the spring 6 also contributes to returning motion of the mirror. When the mirror M is lowered to a position directly before such a position where it contacts the pin 8, the counterclockwise rotational motions of the driving lever 3 and the control lever 9 are blocked by the pin 12 (as shown by the double dot chain in FIG. 2) and the key 1 returns to the position shown in the solid line in FIG. 1 by the biasing force. After this moment, therefore, only the weak spring 6 acts on the mirror pin 5, causing the further clockwise rotational motion of the mirror M and pressing the mirror M against the positioning pin 8. There is formed a gap between the mirror pin 5 and the strong spring 7, and as a result the biasing force thereof does not act on the mirror pin 5 any more (cf. FIG. 5). On successively advancing the film by means of, for example, a film wind-up lever (not shown) the charging lever 15 is shifted to the left from the position shown in the solid line in FIGS. 1 and 2, thus returning the control lever 9 to the position shown in the solid line in FIG. 1 against the biasing force of the springs 10 and 11 and releasing, by means of an unshown mechanism, the locked mirror descending key 13 which has been maintained in a position it reached after the running of the second blind. By means of the spring 14, therefore, the mirror descending key 13 is returned to the position shown in the solid line in FIG. 1 to block the end portion 9b of the control lever 9. Thereafter the charging lever 15 is displaced to the right and is returned to the position shown in the solid line. On the other hand, on returning movement of the control lever 9 to the position shown in the solid line in FIG. 1, the driving lever 3 is biased in a clockwise direction by the spring 10 but the rotational motion of the lever is blocked by the mirror ascending key 1. In such manner, the mirror driving device returns to the solid line state in FIG. 1 wherein the light passing through the lens Le is again directed to the unshown view finder system.

Figure 6:
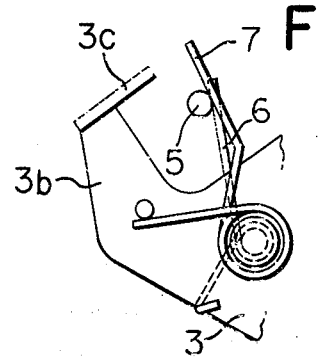

Now there will be explained a case where the mirror M is erroneously moved by a photographer while it is positioned within the phototaking optical path or the viewing-focusing position. For example, if the mirror M is held at the end thereof and forcibly raised from the mirror charge completed state shown in FIG. 1, the mirror pin 5 also is rotated counterclockwise and the mirror M ascends against the biasing force of the springs 6 and 7 as shown in FIG. 6. Accordingly, even if the mirror M is moved in such manner, the force for raising the mirror M is absorbed by the springs 6 and 7 and never directly acts on the other elements. As soon as the mirror M is released, the mirror pin 5 of the mirror M returns to the position shown in FIGS. 1 and 5.

In the foregoing embodiment, the mirror M may be bounced when it descends and collide with the positioning pin 8. However, such bounce of the mirror can be reduced by selecting a small gap between the mirror pin 5 and the spring 7 when the mirror is in the viewing-focusing position (FIGS. 1 and 5) whereby the bounce of the mirror pin 5 is suppressed by the strong spring 7.

Furthermore, in the above-explained mirror driving device the mirror M is lifted by the engagement between the mirror pin 5 and the end portion 3b and is lowered by the engagement between the mirror pin 5 and the strong spring 7. Namely the mirror M moves integrally with the driving lever 3 when the mirror M is raised and lowered. Consequently, the movements of both the mirror M and the driving lever 3 can be damped by a single damping mechanism if it is provided on an element moving integrally with the mirror M (for example the mirror pin 5) or the driving lever 3.

Figure 7:
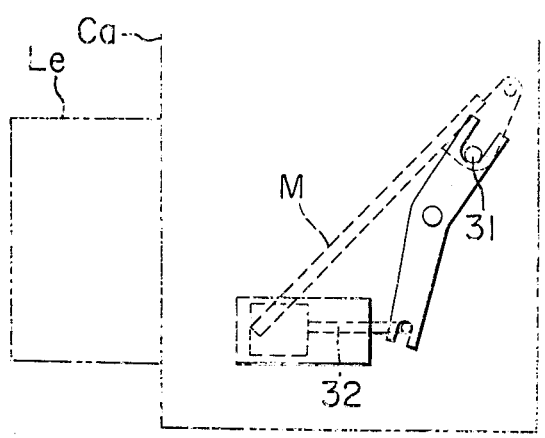
FIGS. 7 and 8 are schematic elevations of another embodiment wherein a damping mechanism is linked with an element moving integrally with the mirror.
Figure 8:
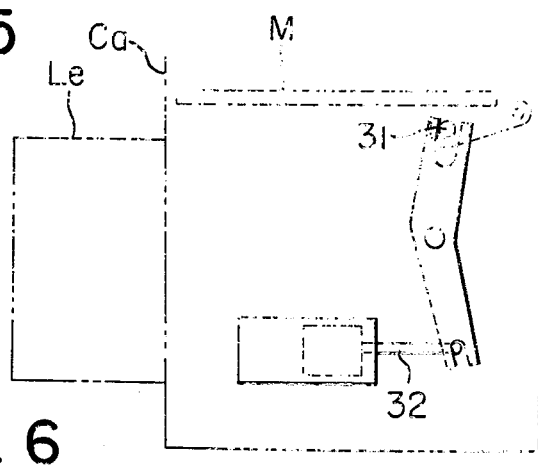

In FIGS. 1 and 2 there is shown an air damper 22 functioning by reciprocating motion of a plunger 21 of which an integral pin 21a is loosely fitted in a hole 3e provided on the end portion 3d of the driving lever 3. In such construction, a damping force is applied to the mirror M and the driving lever 3 at the end of ascension of the mirror M caused by clockwise rotation of the driving lever 3, and also a damping force is applied to both the mirror M and the driving lever 3 at the end of descension of the mirror M caused by counter clockwise rotation of the driving lever 3. In FIGS. 7 and 8 the mirror M provided with an integral pin 31 is shown and its displacement causes a reciprocating motion of a plunger 32, whereby a damping force is applied to the mirror M and the driving lever 3. States in FIGS. 7 and 8 respectively correspond to the states shown in FIGS. 1 and 2, and explanation will be omitted since the function of the structure shown in FIGS. 7 and 8 is similar to that described above.

As explained in detail in the foregoing, according to the present invention, the ascension of the mirror M is hindered only by the biasing force of the weak spring 6 for positioning and the descension of the mirror can be carried out by the strong spring 7 for descending the mirror. Consequently it is possible to achieve a mirror driving device adapted for high-speed mirror motion in which the mirror is raised with small frictional resistance and the mirror is lowered integrally with the driving lever 3 when this lever returns. Furthermore this device is very simple, and causes no damage to the other components even if the mirror M is erroneously manipulated when it is in the viewing position.

Additionally, since the biasing force of the positioning spring is small, the spring for raising the mirror against said biasing force (spring 10 in the embodiment described above) need not have very strong biasing force. This fact in turn means that force required for charging the mirror in association with the film wind-up lever's operation can be reduced. That is, the wind-up lever can be moved lightly.

Furthermore the integral movement of the mirror and the driving lever allows the damping mechanism provided for reducing noise and shock to be provided either on an element moving integrally, with the mirror or on the driving lever, thus increasing freedom of design.

It can readily be seen that many variations and modifications of the invention are possible in the light of the aforementioned teachings, and it will be apparent to those skilled in the art that various changes in form and arrangement of components without departing from the spirit and scope of the invention.

What we claimed is :

1. A mirror driving device for use in a single lens reflex camera for controlling ascension and descension of a mirror, said device comprising a driving member pivotally mounted to a body of said camera and having an engaging portion, means for holding the mirror, said holding means being operated by means of reciprocating motion of said driving member to control the ascension and descension of the mirror, and biasing means consisting of a first biasing member and a second biasing member both of which are provided on said driving member, said holding means having a portion surrounded by said first and second biasing members and said engaging portion, said first biasing member having relatively strong biasing force and engaging said engaging portion, said second biasing member having relatively weak biasing force and always biasing said holding means so as to cause the mirror to descend, whereby the mirror is raised when said holding means is moved by said driving member upon forward motion of said driving member and the mirror is lowered when said holding means is moved by said first and second biasing members upon returning motion of said driving member and the mirror is stationed in a viewing-focusing position by pressing said holding means solely with the biasing force of said second biasing member when said driving member returns to its original position.

2. A mirror driving device according to claim 1, wherein a damping mechanism is provided on said driving member.

3. A mirror driving device according to claim 1, wherein a damping mechanism is provided on a member moving integrally with the mirror.

4. A mirror driving device according to claim 1, wherein said portion of said holding means consists of a pin fixedly provided on said holding means.

5. A mirror driving device according to claim 4, further comprising:
    means for causing said driving member to take said forward motion in cooperation with a shutter release operation of said camera, and to take said returning motion when the shutter release has been completed.

* * * * *